United States Patent [19]

Sanders

[11] Patent Number: 4,991,122
[45] Date of Patent: Feb. 5, 1991

[54] WEIGHTED MAPPING OF COLOR VALUE INFORMATION ONTO A DISPLAY SCREEN

[75] Inventor: Eugene T. Sanders, Oakland, Calif.

[73] Assignee: General Parametrics Corporation, Berkeley, Calif.

[21] Appl. No.: 401,580

[22] Filed: Aug. 31, 1989

Related U.S. Application Data

[63] Continuation of Ser. No. 105,947, Oct. 7, 1987, abandoned.

[51] Int. Cl.$^5$ .............................................. G06F 15/62
[52] U.S. Cl. .................................. 364/521; 364/518; 340/701; 340/731
[58] Field of Search ................ 364/518, 521; 340/701, 340/703, 731

[56] References Cited

U.S. PATENT DOCUMENTS

| | | | |
|---|---|---|---|
| 4,233,601 | 11/1980 | Hankins et al. | 340/703 |
| 4,237,457 | 12/1980 | Houldsworth | 340/728 |
| 4,439,759 | 3/1984 | Fleming et al. | 340/703 |
| 4,442,428 | 4/1984 | Dean et al. | 340/703 |
| 4,447,809 | 5/1984 | Kodama et al. | 340/747 |
| 4,454,506 | 6/1984 | Netravali et al. | 340/728 |
| 4,475,104 | 10/1984 | Shen | 340/729 |
| 4,475,161 | 10/1984 | Stock | 364/521 |
| 4,484,187 | 11/1984 | Brown et al. | 340/703 |
| 4,491,863 | 1/1985 | Kurahashi | 340/703 X |
| 4,509,043 | 4/1985 | Mossaides | 340/721 |
| 4,532,503 | 7/1985 | Pennebaker | 340/728 |
| 4,584,572 | 4/1986 | Lambert, III | 340/703 |
| 4,652,912 | 3/1987 | Masubuchi | 340/703 X |
| 4,725,828 | 2/1988 | Cowlishaw | 340/703 |
| 4,730,185 | 3/1988 | Springer et al. | 340/703 X |
| 4,740,832 | 4/1988 | Sprague et al. | 340/703 X |
| 4,771,275 | 9/1988 | Sanders | 340/703 |
| 4,827,433 | 5/1989 | Kamon | 364/518 |

FOREIGN PATENT DOCUMENTS 2089625A 6/1982 United Kingdom.

*Primary Examiner*—Gary V. Harkcom
*Assistant Examiner*—Mark K. Zimmerman
*Attorney, Agent, or Firm*—Townsend and Townsend

[57] ABSTRACT

A method and apparatus for assigning color values (or gray scale) to picture display locations. A large frame buffer is written into with each memory location (preferably one bit) corresponding to a separate element of an image. The frame buffer contents are then mapped into a smaller space. The frame buffer memory has a color value assigned to each location of the memory. The memory has a larger number of locations than the number of color picture display locations. Each location is also assigned one of a plurality of weights. A number of color patterns are created and stored, with each color pattern being a bit pattern designed to produce the desired color when applied to the color values of the memory locations. A representation of a desired image is written into the memory using the color patterns, with each memory location corresponding to a separate element of the image. A group of bits in adjacent memory locations are combined with their weighting factors to produce each color value for each color picture display location.

25 Claims, 8 Drawing Sheets

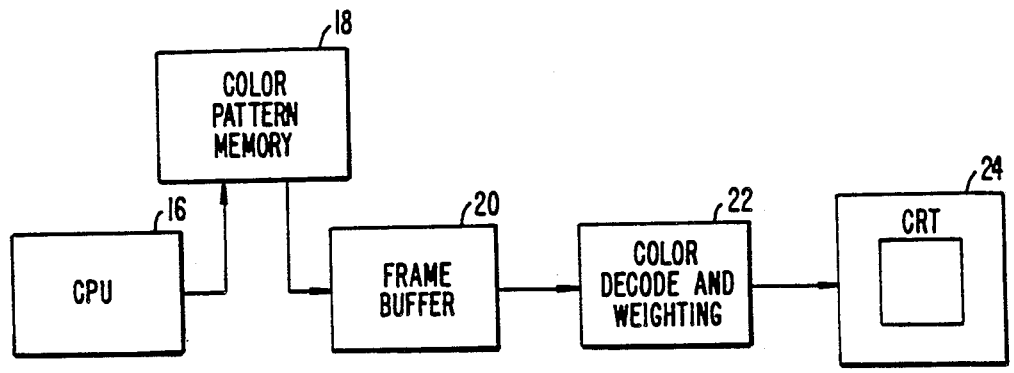
FIG._1.
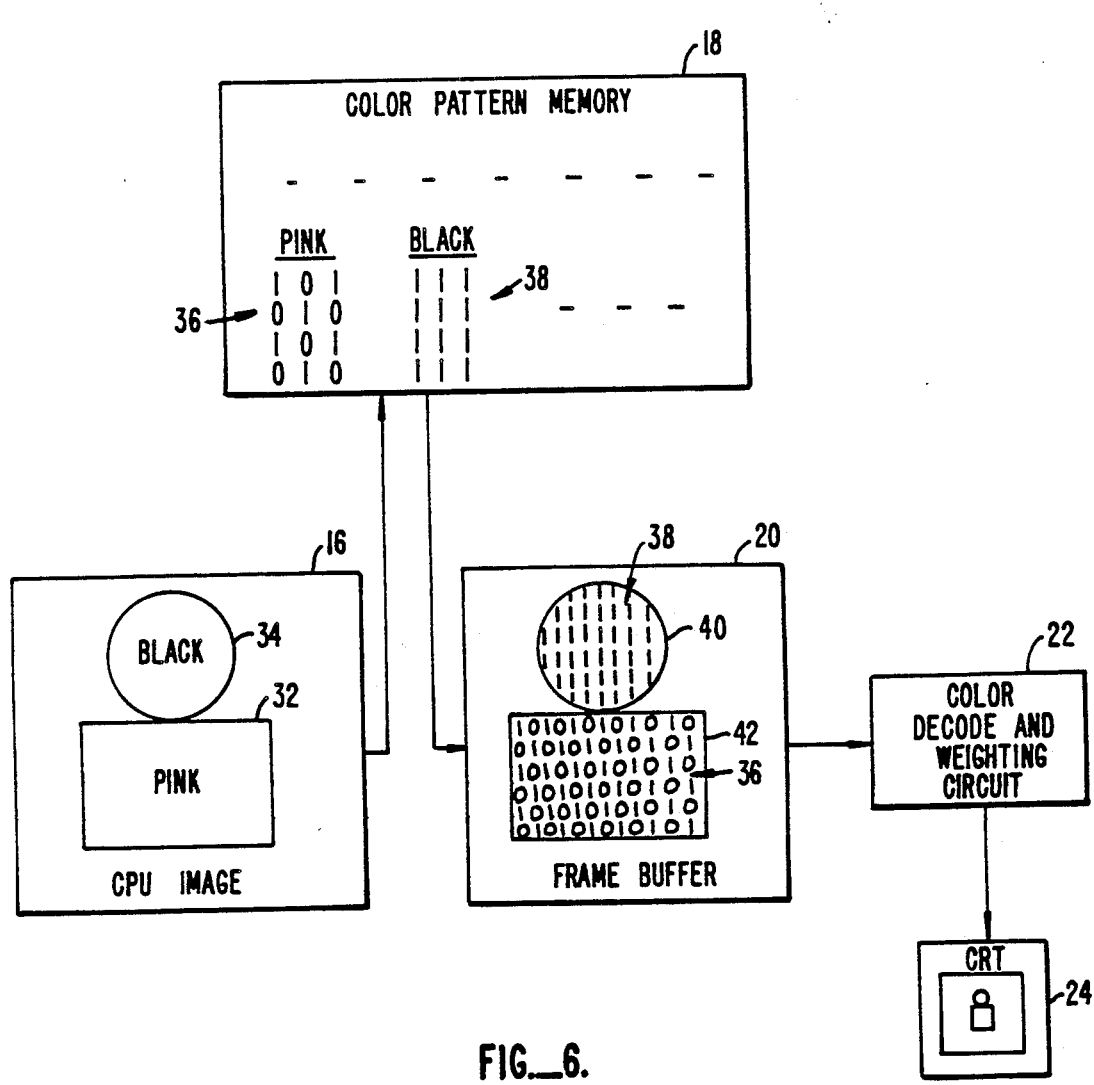
FIG._6.

|   | 0 | 1 | 2 | 3 | 4 | 5 | 6 | 7 |
|---|---|---|---|---|---|---|---|---|
| 0 | $Y_4$ | $U_4$ | $Y_1$ | $V_2$ | $Y_4$ | $U_1$ | $Y_1$ | $V_4$ |
| 1 | $U_4$ | $Y_4$ | $V_1$ | $Y_2$ | $U_2$ | $Y_4$ | $V_4$ | $Y_2$ |
| 2 | $Y_1$ | $V_4$ | $Y_4$ | $U_1$ | $Y_1$ | $V_1$ | $Y_4$ | $U_4$ |
| 3 | $V_4$ | $Y_2$ | $U_2$ | $Y_4$ | $V_2$ | $Y_2$ | $U_4$ | $Y_4$ |
| 4 | $Y_4$ | $U_2$ | $Y_2$ | $V_4$ | $Y_4$ | $U_4$ | $Y_2$ | $V_2$ |
| 5 | $U_1$ | $Y_4$ | $V_4$ | $Y_1$ | $U_4$ | $Y_4$ | $V_1$ | $Y_1$ |
| 6 | $Y_2$ | $V_1$ | $Y_4$ | $U_4$ | $Y_2$ | $V_4$ | $Y_4$ | $U_2$ |
| 7 | $V_2$ | $Y_1$ | $U_4$ | $Y_4$ | $V_4$ | $Y_1$ | $U_1$ | $Y_4$ |
| 8 | $Y_4$ | $U_4$ | $Y_1$ | $V_1$ | $Y_4$ | $U_2$ | $Y_1$ | $V_4$ |
| 9 | $U_4$ | $Y_4$ | $V_2$ | $Y_2$ | $U_1$ | $Y_4$ | $V_4$ | $Y_2$ |
| 10 | $Y_1$ | $V_4$ | $Y_4$ | $U_2$ | $Y_1$ | $V_2$ | $Y_4$ | $U_4$ |
| 11 | $V_4$ | $Y_2$ | $U_1$ | $Y_4$ | $V_1$ | $Y_2$ | $U_4$ | $Y_4$ |
| 12 | $Y_4$ | $U_1$ | $Y_2$ | $V_4$ | $Y_4$ | $U_4$ | $Y_2$ | $V_1$ |
| 13 | $U_2$ | $Y_4$ | $V_4$ | $Y_1$ | $U_4$ | $Y_4$ | $V_2$ | $Y_1$ |
| 14 | $Y_2$ | $V_2$ | $Y_4$ | $U_4$ | $Y_2$ | $V_4$ | $Y_4$ | $U_1$ |
| 15 | $V_1$ | $Y_1$ | $U_4$ | $Y_4$ | $V_4$ | $Y_1$ | $U_2$ | $Y_4$ |

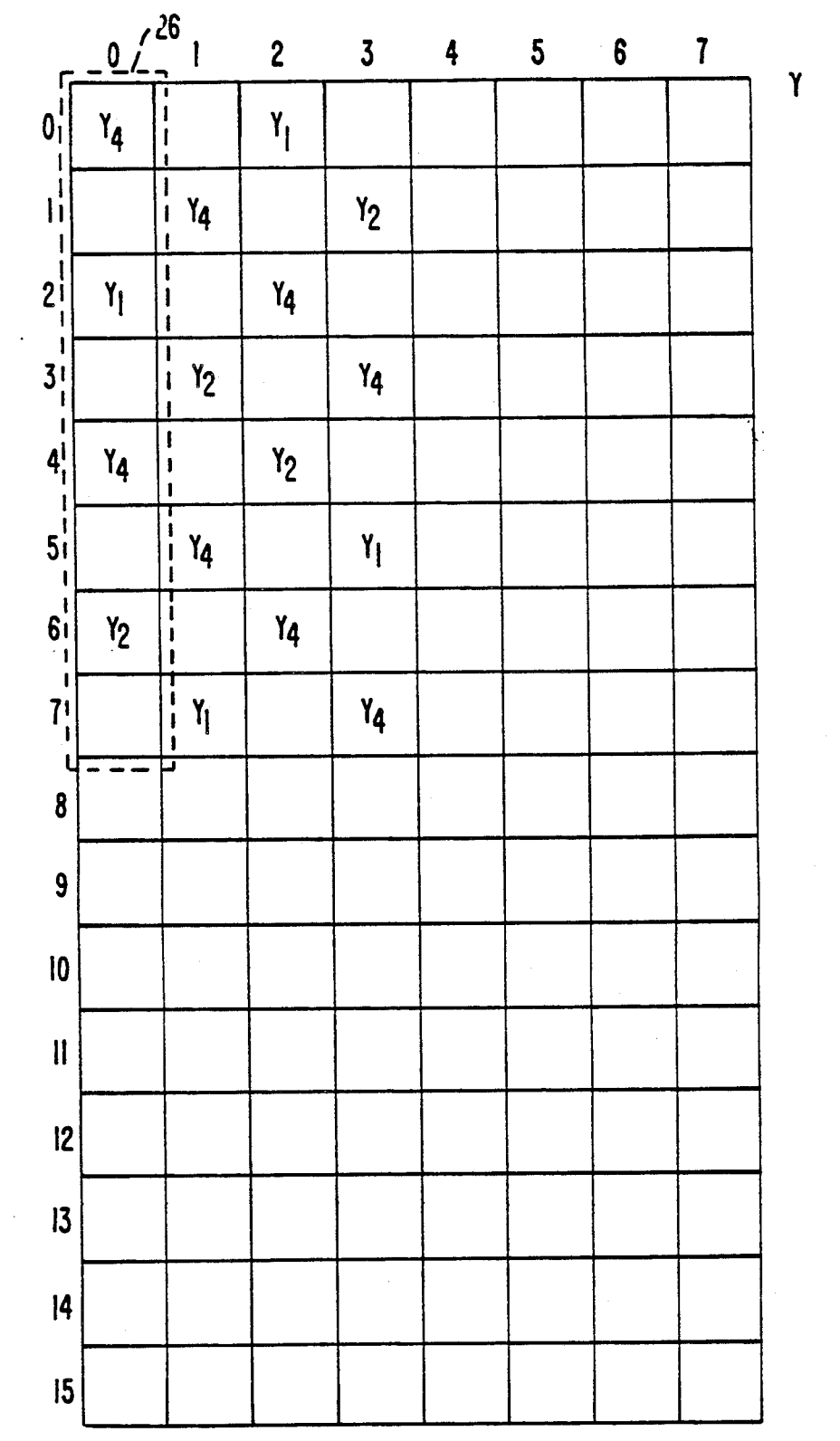

|  | 0 | 1 | 30  2 | 3 | 4 | 5 | 6 | 7 |
|---|---|---|---|---|---|---|---|---|
| 0 |  |  |  | $V_2$ |  |  |  | $V_4$ |
| 1 |  |  | $V_1$ |  |  |  | $V_4$ |  |
| 2 |  | $V_4$ |  |  |  | $V_1$ |  |  |
| 3 | $V_4$ |  |  |  | $V_2$ |  |  |  |
| 4 |  |  |  | $V_4$ |  |  |  | $V_2$ |
| 5 |  |  | $V_4$ |  |  |  | $V_1$ |  |
| 6 |  | $V_1$ |  |  |  | $V_4$ |  |  |
| 7 | $V_2$ |  |  |  | $V_4$ |  |  |  |
| 8 |  |  |  | $V_1$ |  |  |  | $V_4$ |
| 9 |  |  | $V_2$ |  |  |  | $V_4$ |  |
| 10 |  | $V_4$ |  |  |  | $V_2$ |  |  |
| 11 | $V_4$ |  |  |  | $V_1$ |  |  |  |
| 12 |  |  |  | $V_4$ |  |  |  | $V_1$ |
| 13 |  |  | $V_4$ |  |  |  | $V_2$ |  |
| 14 |  | $V_2$ |  |  |  | $V_4$ |  |  |
| 15 | $V_1$ |  |  |  | $V_4$ |  |  |  |

FIG._5.

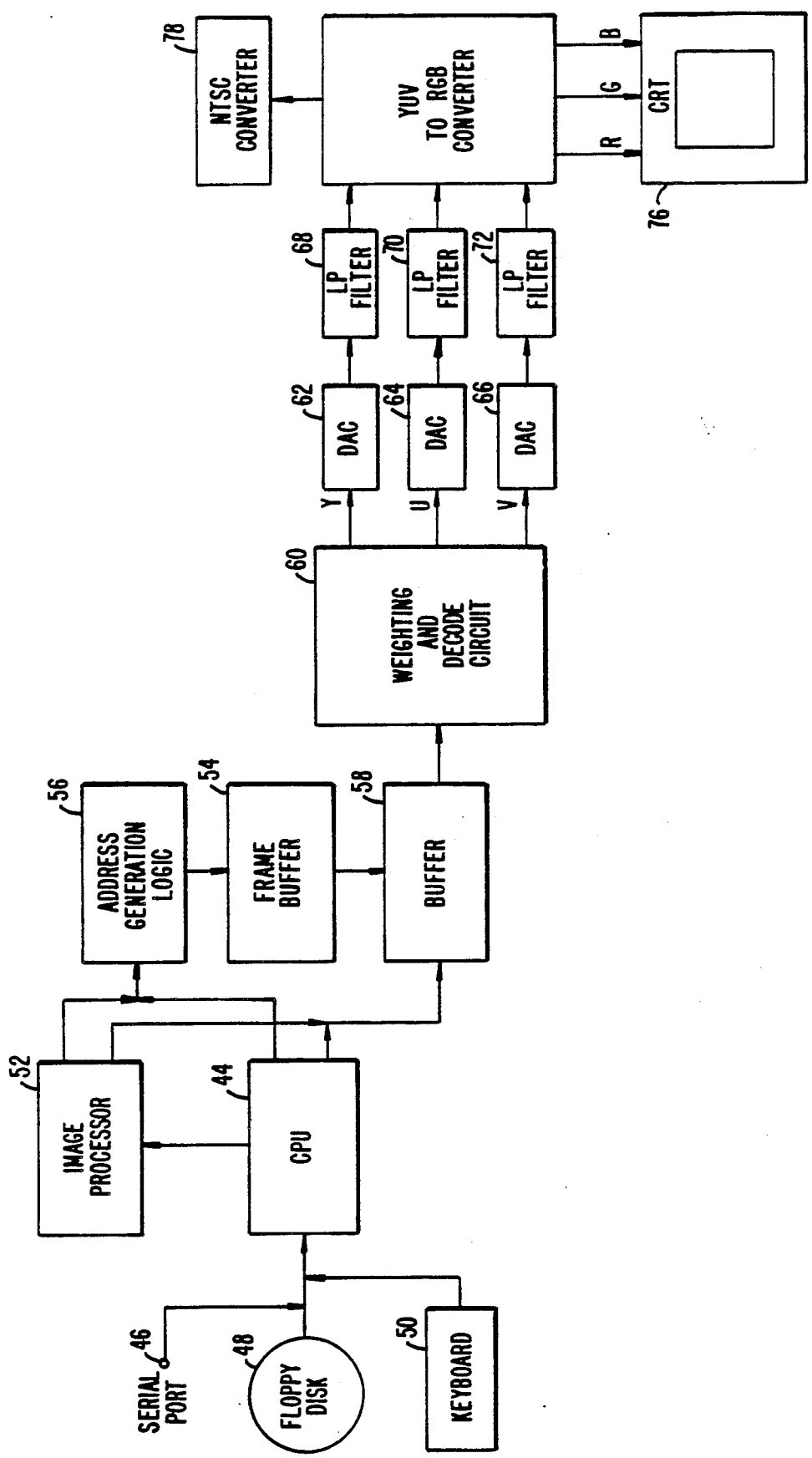
FIG._7.

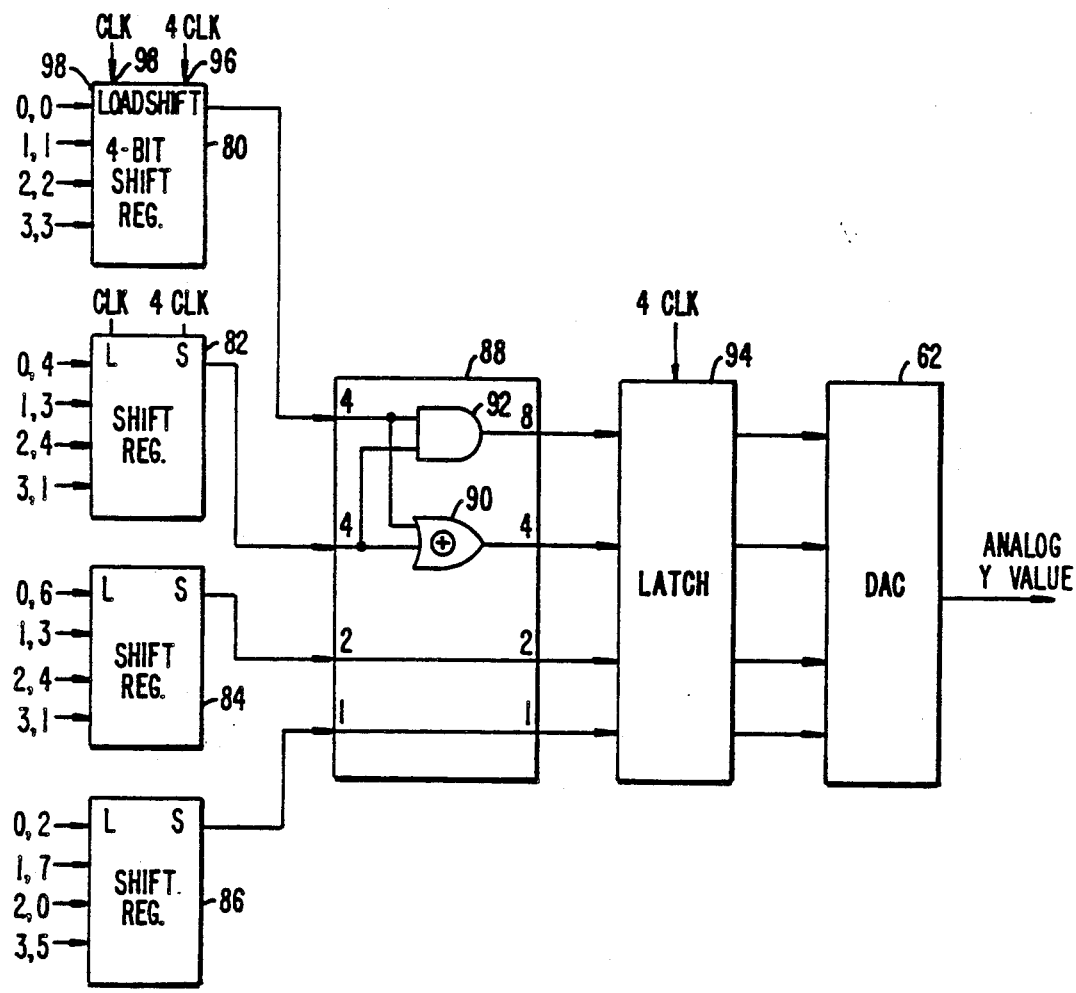
FIG._8.

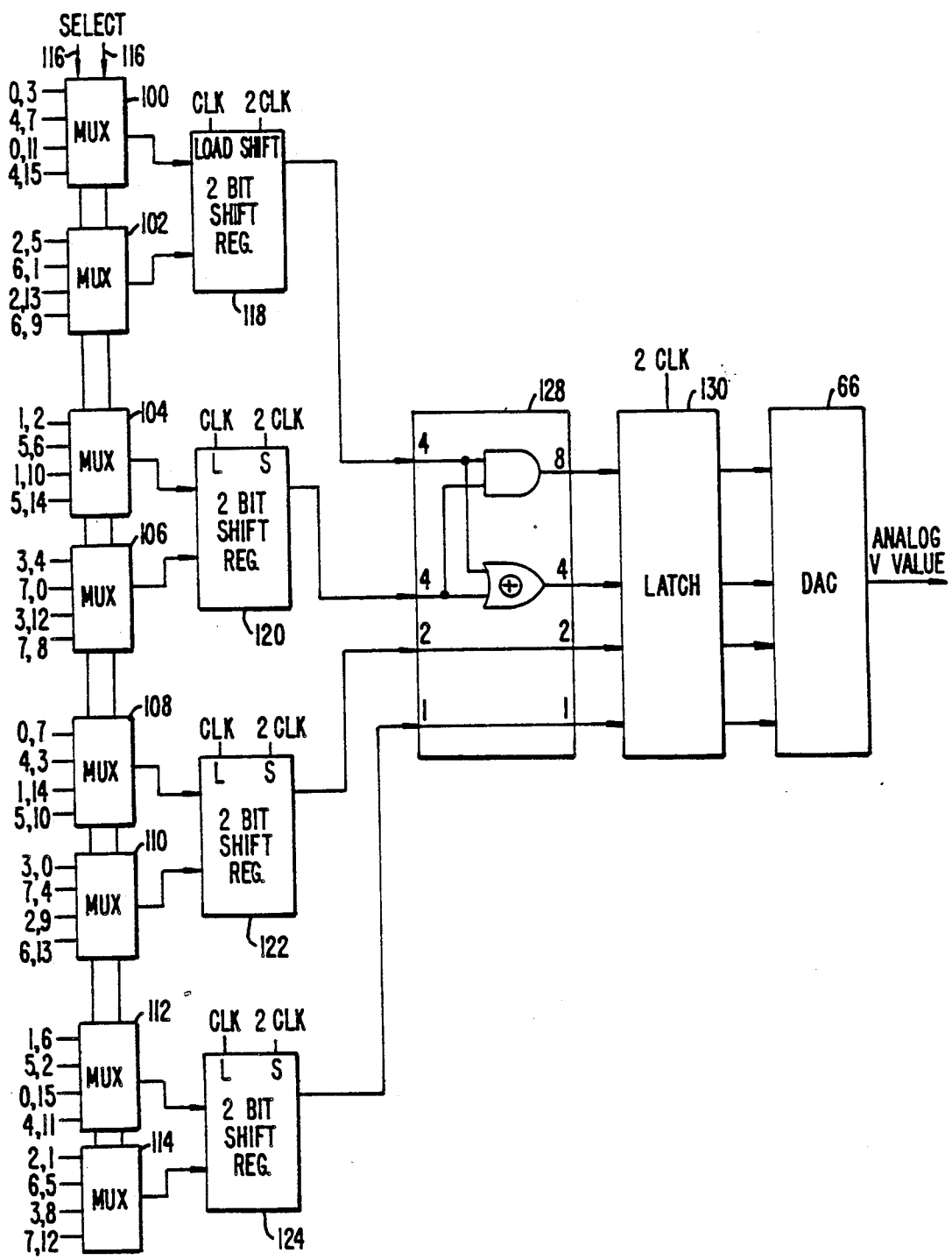
FIG._9.

WEIGHTED MAPPING OF COLOR VALUE INFORMATION ONTO A DISPLAY SCREEN

This is a continuation of application Ser. No. 07/105,947, filed Oct. 7, 1987, now abandoned.

Appendix I is a listing of one embodiment of a set of color patterns.

BACKGROUND

The present invention relates to methods and apparatus for mapping color or gray scale values onto a monitor.

A typical display system consists of a computer, a frame buffer and a CRT display. The quality of the image produced in such a system is related to the number of pixels generated, the number of colors that can be assigned to each pixel and the type of processing done by the computer. A very crude system might display only 256 by 256 pixels with only two levels (black or white) for each pixel. A higher end system might display 512 by 512 pixels with 16 million colors (256 levels for each of red, green and blue) for each pixel.

The latter system is capable of displaying very high quality natural images captured from a TV camera or similar source. However, when using simple computer algorithms for generating synthetic images (consisting of text, lines, polygons, etc.) on such a system, the results often look little better than on the crude 256 by 256 pixel system due to the jagged and stair-stepped edges on some objects. These problems are called aliasing artifacts. Antialiasing algorithms can be used which eliminate many aliasing artifacts to produce smooth looking results. However, such algorithms often take excessive time for display generation, complicate other aspects of system design and sometimes "soften" the resulting image in an undesirable way.

A straightforward way to minimize aliasing artifacts without using antialiasing algorithms is to increase the number of pixels displayed. A display system having something in the range of 2000 by 2000 pixels to 4000 by 4000 pixels would suffer minimal image degradation due to aliasing artifacts. Implementing such a display system using prior art would require a frame buffer with between 8 and 24 bits per pixel for a total number of bits ranging from 32 million to 100 million or more bits. The preferred embodiment of the present invention acts as a 4000 by 2000 frame buffer using only 8 million bits.

For a display system which does not require a large number of colors, a color map may be used to reduce the size of the frame buffer required. Instead of storing a color value for each display location, an address for a separate color map is stored, with the address location containing the actual color value. However, for natural image displays which require a large number of colors (in the thousands) a color map is not as useful because the number of bits required for the color map address is comparable to the number of bits required for the color value itself, and the color map requires a larger amount of additional memory.

Dithering is one way to reduce the number of bits when the number of colors desired is too large for color mapping. Dithering involves alternating colors between adjacent positions so that the pattern appears to be a composite color to the human eye.

Some systems store the video image in YUV format rather than RGB format. In this format, Y corresponds to luminance information (brightness), U corresponds to the blue color difference value and V corresponds to the red color difference value. Thus, luminance information is separated from the red, green and blue colors. A linear conversion will convert the YUV information to RGB information. Because the luminance portion is separated out, this coding has advantages in some applications. Such a system will convert the YUV information back into RGB information before supplying the data to the CRT.

SUMMARY OF THE INVENTION

The present invention is a method and apparatus for assigning color values (or gray scale) to picture display locations. A large frame buffer is written into with each memory location (preferably one bit) corresponding to a separate element of an image. The frame buffer contents are then mapped into a smaller space. The frame buffer memory has a color value assigned to each location of the memory. The memory has a larger number of locations than the number of color picture display locations. Each location is also assigned one of a plurality of weights. A number of color patterns are created and stored, with each color pattern being a bit pattern designed to produce the desired color when applied to the color values of the memory locations. A representation of a desired image is written into the memory using the color patterns, with each memory location corresponding to a separate element of the image. A group of bits in adjacent memory locations are combined with their weighting factors to produce each color value for each color picture display location.

The present invention thus provides a method for writing a large image into the frame buffer memory with each position (bit) of the frame buffer having both spatial and color information. A group of bits is used to form a value for a display location (e.g., pixel) and thus the frame buffer stores sub-pixel spatial and color information. The coding of color values in the frame buffer with a color pattern memory and its subsequent decoding optimizes the system by reducing the amount of frame buffer memory needed at the expense of introducing some color roughness and high frequency noise artifacts. Unlike the prior art, where a multi-bit value corresponds to one image element, each bit in the frame buffer of the present invention corresponds to a different element of the image.

The CPU (central processing unit) can write into the frame buffer as if it were a large display and the subsequent reduction of the image is done with minimal degradation.

In the preferred embodiment, the color values used are the YUV color values. The Y values are assigned to twice as many memory locations as the U values or the V values. Because the human eye detects spatial differences primarily from luminance (brightness), more locations are dedicated to luminance with the result being a sharper image. Since the human eye is more tolerant of the blurring of color transitions, fewer locations are assigned to color values.

Each memory location, in addition to having a color value (one of Y, U or V) also has a weight which is preferably one of four, two or one. These weights are used to produce an average value of the color value over an area. By using different weights, the color desired can be generated in a smaller area (fewer locations) than would be required if equal weights were used.

The data from the frame buffer is supplied to a weighting and decode circuit. For luminance (Y) values, each display location uses four of every eight bits from the frame buffer. These four bits are picked off as having luminance information. Of these bits, two have a weighting of four with the other bits having weightings of two and one, respectively. A decode circuit provides a combined 4-bit digital value from these four bits with the one bit being the least significant position, the two bit being the next position, followed by an exclusive OR function of the two weight-4 bits for the third position and an AND function of the two weight-4 bits for the last, most significant position.

Preferably, the frame buffer contains an image space 2,000 locations wide and 4,000 locations high. This is converted into a smaller display area for writing on a typical CRT.

The blue color difference (U) and red color difference (V) signals each have four bits in each collection of 16 bits. Thus, these values are provided to the CRT with only half the frequency of the luminance values. In other words, the U and V values are provided for two pixels while the luminance values are provided for each pixel.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic diagram of a color value mapping system according to the present invention;

FIG. 2 is a diagram of the color value and weighting assignments in the frame buffer of FIG. 1;

FIG. 3 is a diagram of the luminance (Y) frame buffer assignments;

FIG. 4 is a diagram of the blue color difference value (U) assignments in the frame buffer;

FIG. 5 is a diagram of the red color difference value (B) assignments in the frame buffer;

FIG. 6 is a schematic diagram illustrating the assignment of color patterns to the frame buffer;

FIG. 7 is a block diagram of a preferred embodiment of a mapping system according to the present invention;

FIG. 8 is a schematic diagram of the weighting and decode logic of FIG. 7 for the luminance (Y) values; and FIG. 9 is a schematic diagram of the weighting and decode circuit of FIG. 7 for the red color difference (R) values.

DETAILED DESCRIPTION OF THE PREFERRED EMBODIMENTS

FIG. 1 shows a mapping system according to the present invention. A CPU 16 provides an image description to a color pattern memory 18. A pattern corresponding to a color from memory 18 is written into a frame buffer 20 at the positions designated for those colors by CPU 16. Each location of frame buffer 20 has been previously assigned a color value and a weight. The patterns in pattern memory 18 take into account these assignments to produce the desired color from the output of frame buffer 20. The output of frame buffer 20 is passed through a color decode and weighting circuit 22 which produces the desired colors by decoding the bit patterns in the frame buffer 20 in accordance with their assigned color values. The bits are also weighted and combined to produce an average value so that a reduced image can be presented to CRT 24.

FIG. 2 shows a map of an 8×16 portion of frame buffer 20 with color value and weighting assignments for each location. The pattern of FIG. 2 repeats throughout the frame buffer. The Y, U and V components of the pattern of FIG. 2 are shown in FIGS. 3, 4 and 5, respectively.

FIG. 3 shows the Y components for a 4×8 portion of the frame buffer. This 4×8 pattern is duplicated throughout the frame buffer. Each 1×8 column corresponds to a display location on the CRT. For instance, the luminance value for a first display location is represented by the Y values in area 26. As can be seen, two Y values with the weighting of four are provided with one Y value having a weighting of two and a last Y value having a weighting of one.

FIG. 4 shows the U values assigned to the frame buffer locations. The U value pattern repeats in every 8×16 block. A single display location value is provided by each 2×8 block, such as block 28. As can be seen, block 28 contains two U values with the weighting of four, one with the weighting of two and one with the weighting of one. This U color value will be used for two display locations which may have different luminance values.

FIG. 5 shows the frame buffer locations assigned to the V value. Similar to FIG. 4, each 2×8 portion of locations corresponds to a single display location, such as portion 30. The V value pattern also repeats in every 8×16 block.

FIG. 6 illustrates the way in which color patterns are written into frame buffer 20. CPU 16 generates an image which is shown in the example as having a rectangular pink region 32 and a circular black region 34. This description is provided to color pattern memory 18 which looks up a color pattern 36 for pink and a color pattern 38 for black. These color patterns are not actual patterns but are shown for illustrative purposes only. The patterns are then provided to the appropriate portions of frame buffer 20 so that a circular region 40 corresponding in area to region 34 from CPU 16 is written into with the black pattern 38 while the rectangular region 42 is written into with the pattern 36. These patterns are generated so that when the zero or one bits are applied to the Y, U or V values, the combination of these values will produce the desired color. The data in the frame buffer is provided to a color decode and weighting circuit 22 which produces a luminance (Y) and U and V color difference signals for each CRT display location by combining groups such as groups 26, 28 and 30 of FIGS. 3, 4 and 5, respectively. The signals are then converted into RGB format and provided to a CRT 24.

As can be seen, by providing a coded color and weighting structure to frame buffer 20, both spatial and color values are provided for each bit location at a sub-pixel level. The color patterns and the subsequent decoding of the frame buffer takes advantage of the fact that each position in the frame buffer is associated with a coded value.

Using the weighting defined in the preferred embodiment within a display area approximately 1/512 by 1/512, it is possible to create 45 levels of luminance and 23 levels each of chroma. An example of such a set of patterns is shown in Appendix I.

Each line of the Appendix shows a level followed by 16 bytes in hexadecimal form. Each byte represents a line from the table shown in FIG. 2. (Note that FIG. 2 information is shown least significant bit first, but that the two hexadecimal digits are shown with least significant bit last.)

A pattern for a particular color can be created by adding together one line of data from each table—Y+U+V.

By dithering these patterns over a larger area it is possible to create a larger number of colors. For example, within an area of 1/256 by 1/256 it is possible to create colors with 177 levels of luminance and 89 levels each of chroma. This is sufficient to make a good representation of a natural image.

FIG. 7 is a block diagram of a preferred embodiment of the color mapping system according to the present invention. A CPU 44 is provided which can receive inputs from either a serial port 46, a floppy disk 48 or a keyboard 50. CPU 44 is used to produce synthetic images. Natural images are produced by an image processor 52 which contains a processor for decoding a representation of a natural image (e.g., from a TV camera).

Either CPU 44 or image processor 52 will provide the image to a frame buffer 54. The addresses are provided to frame buffer 54 through address generation logic 56, while the bits to be written into the frame buffer are provided through an intermediate buffer and logic circuit 58. Buffer and logic circuit 58 receives geometric instructions which are converted into bit positions for frame buffer 54. Buffer and logic circuit 58 also provides bits from frame buffer 54 to weighting and decode circuit 60. Circuit 60 decodes the bits in accordance with the color value and weight for each bit position and produces Y, U and V values to digital to analog converters (DAC) 62, 64 and 66. These values are then processed through low pass filters 68, 70 and 72 and are then provided to a YUV to RGB converter 74. Converter 74 provides the RGB values to a CRT 76 or alternately to an NTSC converter 78 for transmission externally.

The color pattern memory 18 of FIG. 1 is actually a portion of frame buffer 54 which is not used for the image.

Buffer and logic circuit 58 handles 128 bits at a time from frame buffer 54. Buffer and logic circuit 58 accepts instructions from CPU 44 or image processor 52 to copy patterns to specific bit addresses within frame buffer 54 defining a particular geometry. Buffer and logic circuit 58 contains the circuitry to modify as little as one bit at a time or as much as 128 bits at a time when drawing an image. Buffer and logic circuit 58 supplies 32 bits at a time to weighting and decode circuit 60 at the refresh rate for CRT 76.

Weighting and decode circuit 60 is implemented with PLAs (programmable logic arrays). FIGS. 8 and 9 set forth logically the PLA circuitry for luminance and color difference values, respectively. The actual PLA circuits may be different from FIGS. 8 and 9, but the logic format of FIGS. 8 and 9 aids in understanding the invention.

FIG. 8 shows the weighting and decode circuit for the luminance (Y) values. 32 bits are provided to the weighting and decode circuit. Four shift registers 80, 82, 84 and 86 receive 16 bits at a time of the 32 bits from the locations indicated which correspond to the display locations set forth in FIG. 3. The 16 bits correspond to four columns, starting with column 26 shown in FIG. 3. Each column is sequentially shifted through so that one of these columns is processed at a time. For instance, for column 26, the bit at 0,0 is loaded into shift register 80, the bit at 0,2 is loaded into shift register 86, the bit at 0,4 is loaded into shift register 82, and the bit at 0,6 is loaded into bit register 84. These bits have weights of 4, 4, 2 and 1 as indicated in FIG. 3 and as indicated at the outputs of the shift registers in FIG. 8 which are provided to the inputs of a decode and weighting circuit 88. The 2 and 1 values are passed through to the output of decode circuit 88, while an exclusive OR function is provided by exclusive OR gate 90 on the two 4-weight values to produce a third output value while the two 4-weight bits are combined in an AND gate 92 to produce a fourth output value. The output values of decode circuit 88, labeled as 1, 2, 4 and 8 correspond to the least significant to most significant values of a four bit digital value. This value is provided to a latch 94 and then to a digital to analog converter (DAC) 62. DAC 62 is actually external to the weighting and decode circuit 60 shown in FIG. 7. The output of DAC 62 is an analog luminance (Y) value.

After the first group 26 of FIG. 3 has been processed, the shift registers are shifted with a clock signal to a shift input 96. This clock signal operates at four times the clock rate of a clock provided to a load input 98 of each shift register. After the first shift, the bits in column 1 are provided to decode logic 88. These are bit 1,1 from shift register 80, bit 1,5 from shift register 82, bit 1,3 from shift register 84 and bit 1,7 from shift register 86. In a similar manner, the rest of the groups from the frame buffer are processed.

FIG. 9 illustrates the weighting and decode logic for the red color difference values (V) of FIG. 5. A similar circuit would be used for the blue color values of FIG. 4. The same 32-bit block as is supplied to the luminance (Y) circuit of FIG. 8 is supplied to the circuit of FIG. 9 (i.e., column 0–3 and rows 0–7). Eight of these are provided as inputs to multiplexers 100, 102, 104, 106, 108, 110, 112 and 114. Since the pattern of FIG. 5 does not repeat in every 32 position portion as in FIG. 3, the 8 bits from each of four different 32-bit quadrants must be supplied to the circuit of FIG. 9. Select lines 116 to the multiplexers designate which quadrant is to be processed and accordingly which input to the multiplexers is to be provided through to a 2-bit shift register. Since only half as many positions contain red color difference values as contain luminance values, only a 2-bit shift register is needed rather than the 4-bit shift register for the luminance values in FIG. 8.

Thus, for a group 30 shown in FIG. 5, shift register 118 will receive the bit at 0,3 from multiplexer 100. Multiplexer 102 will provide the bit at 2 and 3, rows 0–7. Similarly, the bits for the other 4-weight position and the 2-weight and 1-weight position are provided to shift registers 120, 122 and 124.

The circuit of FIG. 9 contains a weighting and decode circuit 128 and a latch 130 similar to circuits 88 and 94 of FIG. 8. The outputs are provided to a DAC 66 which produces an analog V value at its output. The clock rate used for latch 130 and for the shift input of the registers is half the clock rate used in FIG. 8 since the color difference signals are provided only half as often as the luminance signals.

As will be understood by those familiar with the art, the present invention may be embodied in other specific forms without departing from the spirit or essential characteristics thereof. For example, the frame buffer could be mapped directly with RGB values rather than YUV values. Alternately, a different weight system could be used. For instance, the frame buffer size could be doubled, with eight bits for each Y having values of 1, 3, 3, 3, 9, 9, 9 and 9 rather than four bits with values of 1, 2, 4 and 4. Accordingly, the disclosure of the preferred embodiment of the invention is intended to be illustrative, but not limiting, of the scope of the invention which is set forth in the following claims.

APPENDIX I

23 U Chroma patterns

| | |
|---|---|
| 00 | 00 00 00 00 00 00 00 00 00 00 00 00 00 00 00 00 |
| 01 | 20 00 00 00 00 01 00 00 00 10 00 00 02 00 00 00 |
| 02 | 20 00 08 00 00 01 00 40 00 10 00 04 02 00 80 00 |
| 03 | 00 10 08 00 02 00 00 40 20 00 00 04 00 01 80 00 |
| 04 | 00 10 00 04 02 00 80 00 20 00 08 00 00 00 01 00 40 |
| 05 | 20 10 00 04 02 01 80 00 20 10 08 00 02 01 00 40 |
| 06 | 20 10 08 04 02 01 80 40 20 10 08 04 02 01 80 40 |
| 07 | 00 01 08 04 00 10 80 40 02 00 08 04 20 00 80 40 |
| 08 | 00 01 00 40 00 10 00 04 02 00 80 00 20 00 08 00 |
| 09 | 20 01 00 40 00 11 00 04 02 10 80 00 22 00 08 00 |
| 0A | 20 01 08 40 00 11 00 44 02 10 80 04 22 00 88 00 |
| 0B | 00 11 08 40 02 10 00 44 22 00 80 04 20 01 88 00 |
| 0C | 00 11 00 44 02 10 80 04 22 00 88 00 20 01 08 40 |
| 0D | 20 11 00 44 02 11 80 04 22 10 88 00 22 01 08 40 |
| 0E | 20 11 08 44 02 11 80 44 22 10 88 04 22 01 88 40 |
| 0F | 02 01 08 44 20 10 80 44 02 01 88 04 20 10 88 40 |
| 10 | 02 01 80 40 20 10 08 04 02 01 80 40 20 10 08 04 |
| 11 | 22 01 80 40 20 11 08 04 02 11 80 40 22 10 08 04 |
| 12 | 22 01 88 40 20 11 08 44 02 11 80 44 22 10 88 04 |
| 13 | 02 11 88 40 22 10 08 44 22 01 80 44 20 11 88 04 |
| 14 | 02 11 80 44 22 10 88 04 22 01 88 40 20 11 08 44 |
| 15 | 22 11 80 44 22 11 88 04 22 11 88 40 22 11 08 44 |
| 16 | 22 11 88 44 22 11 88 44 22 11 88 44 22 11 88 44 |

23 V Chroma patterns

| | |
|---|---|
| 00 | 00 00 00 00 00 00 00 00 00 00 00 00 00 00 00 00 |
| 01 | 00 04 00 00 00 40 00 00 08 00 00 00 80 00 00 00 |
| 02 | 00 04 20 00 00 40 02 00 08 00 00 10 80 00 00 01 |
| 03 | 08 00 20 00 80 00 02 00 00 04 00 10 00 40 00 01 |
| 04 | 08 00 00 10 80 00 00 01 00 04 20 00 00 40 02 00 |
| 05 | 08 04 00 10 80 40 00 01 08 04 20 00 80 40 02 00 |
| 06 | 08 04 20 10 80 40 02 01 08 04 20 10 80 40 02 01 |
| 07 | 80 00 20 10 08 00 02 01 00 40 20 10 00 04 02 01 |
| 08 | 80 00 02 00 08 00 20 00 00 40 00 01 00 04 00 10 |
| 09 | 80 04 02 00 08 20 00 08 40 00 01 80 04 00 10 |
| 0A | 80 04 22 00 08 40 22 00 08 40 00 11 80 04 00 11 |
| 0B | 88 00 22 00 88 00 22 00 00 44 00 11 00 44 00 11 |
| 0C | 88 00 02 10 88 00 20 01 00 44 20 01 00 44 02 10 |
| 0D | 88 04 02 10 88 40 20 01 08 44 20 01 80 44 02 10 |
| 0E | 88 04 22 10 88 40 22 01 08 44 20 11 80 44 02 11 |
| 0F | 80 40 22 10 08 04 22 01 80 40 20 11 08 04 02 11 |
| 10 | 80 40 02 01 08 04 20 10 80 40 02 01 08 04 20 10 |
| 11 | 80 44 02 01 08 44 20 10 88 40 02 01 88 04 20 10 |
| 12 | 80 44 22 01 08 44 22 10 88 40 02 11 88 04 22 11 |
| 13 | 88 40 22 01 88 04 22 10 80 44 02 11 08 44 20 11 |
| 14 | 88 40 02 11 88 04 20 11 80 44 22 01 08 44 22 10 |
| 15 | 88 44 02 11 88 44 20 11 88 44 22 01 88 44 22 10 |
| 16 | 88 44 22 11 88 44 22 11 88 44 22 11 88 44 22 11 |

45 Luminance patterns

| | |
|---|---|
| 00 | 00 00 00 00 00 00 00 00 00 00 00 00 00 00 00 00 |
| 01 | 00 00 00 00 00 00 00 22 00 00 00 00 00 00 00 22 |
| 02 | 44 00 00 00 00 00 00 22 44 00 00 00 00 00 00 22 |
| 03 | 44 00 00 00 00 88 00 22 44 00 00 00 00 88 00 22 |
| 04 | 44 00 11 00 00 88 00 22 44 00 11 00 00 88 00 22 |
| 05 | 44 00 11 22 00 88 00 00 44 00 11 22 00 88 00 00 |
| 06 | 00 00 11 22 44 88 00 00 00 00 11 22 44 88 00 00 |
| 07 | 00 88 11 22 44 00 00 00 00 88 11 22 44 00 00 00 |
| 08 | 00 88 00 22 44 00 11 00 00 88 00 22 44 00 11 00 |
| 09 | 00 88 00 22 44 00 11 22 00 88 00 22 44 00 11 22 |
| 0A | 44 88 00 22 44 00 11 22 44 88 00 22 44 00 11 22 |
| 0B | 44 88 00 22 44 88 11 22 44 88 00 22 44 88 11 22 |
| 0C | 44 88 11 22 44 88 11 22 44 88 11 22 44 88 11 22 |
| 0D | 44 AA 11 00 44 88 11 00 44 AA 11 00 44 88 11 00 |
| 0E | 00 AA 11 00 00 88 55 00 00 AA 11 00 00 88 55 00 |
| 0F | 00 22 11 88 00 00 55 00 00 22 11 88 00 00 55 00 |
| 10 | 00 22 00 88 11 00 44 00 00 22 00 88 11 00 44 00 |
| 11 | 00 22 00 88 11 00 44 22 00 22 00 88 11 00 44 22 |
| 12 | 44 22 00 88 11 00 44 22 44 22 00 88 11 88 44 22 |
| 13 | 44 22 00 88 11 88 44 22 44 22 00 88 11 88 44 22 |
| 14 | 44 22 11 88 11 88 44 22 44 22 11 88 11 88 44 22 |
| 15 | 44 22 11 AA 11 88 44 00 44 22 11 AA 11 88 44 00 |
| 16 | 00 00 55 AA 55 AA 00 00 00 55 AA 55 AA 00 00 |
| 17 | 00 AA 11 AA 55 00 44 00 00 AA 11 AA 55 00 44 00 |
| A8 | 11 88 44 22 44 22 11 88 11 88 44 22 44 22 11 88 |
| 19 | 11 88 44 22 44 22 11 AA 11 88 44 22 44 22 11 AA |
| 1A | 55 88 44 22 44 22 11 AA 55 88 44 22 44 22 11 AA |
| 1B | 55 88 44 22 44 AA 11 AA 55 88 44 22 44 AA 11 AA |
| 1C | 55 88 55 22 44 AA 11 AA 55 88 55 22 44 AA 11 AA |
| 1D | 55 AA 55 00 44 AA 11 88 55 AA 55 00 44 AA 11 88 |
| 1E | 11 AA 55 00 00 AA 55 88 11 AA 55 00 00 AA 55 88 |
| 1F | 11 22 55 88 00 22 55 88 11 22 55 88 00 22 55 88 |
| 20 | 11 22 44 88 11 22 44 88 11 22 44 88 11 22 44 88 |
| 21 | 11 22 44 88 11 22 44 AA 11 22 44 88 11 22 44 AA |
| 22 | 55 22 44 88 11 22 44 AA 55 22 44 88 11 22 44 AA |
| 23 | 55 22 44 88 11 AA 44 AA 55 22 44 88 11 AA 44 AA |
| 24 | 55 22 55 88 11 AA 44 AA 55 22 55 88 11 AA 44 AA |
| 25 | 55 22 55 AA 11 AA 44 88 55 22 55 AA 11 AA 44 88 |
| 26 | 11 22 55 AA 55 AA 44 88 11 22 55 AA 55 AA 44 88 |
| 27 | 11 AA 55 AA 55 22 44 88 11 AA 55 AA 55 22 44 88 |
| 28 | 11 AA 44 AA 55 22 55 88 11 AA 44 AA 55 22 55 88 |
| 29 | 11 AA 44 AA 55 22 55 AA 11 AA 44 AA 55 22 55 AA |
| 2A | 55 AA 44 AA 55 22 55 AA 55 AA 44 AA 55 22 55 AA |
| 2B | 55 AA 44 AA 55 AA 55 AA 44 AA 55 AA 55 AA |
| 2C | 55 AA 55 AA 55 AA 55 AA 55 AA 55 AA 55 AA 55 AA |

What is claimed is:

1. A method for mapping a source image onto a display having a smaller number of display locations than said source image comprising the steps of:

assigning, in accordance with a first predetermined pattern, one of a plurality of color/gray scale values to each location in a frame buffer, each color/gray scale value being assigned to a number of locations greater than the number of display locations, said predetermined pattern intermixing said color/gray scale values such that each color/gray scale value for each display location is represented by a plurality of frame buffer locations separated by at least one location in either a row or column direction;

assigning, in accordance with a second predetermined pattern, one of a plurality of weights to each said location in said frame buffer;

creating a plurality of color/gray scale patterns, each color/gray scale pattern being a bit pattern designed to produce a desired color or shade of gray when combined in accordance with said color/gray values and weights assigned to said frame buffer locations;

writing a representation of said source image into said frame buffer using said color/gray scale patterns such that a plurality of separate elements of said source image are mapped onto a block of proximate frame buffer locations used to represent a single display location; and separately combining, to produce a total amount of each color/gray scale value for each display location, from a block of proximate frame buffer locations corresponding to said display location, bits stored in locations which were assigned to said color/gray scale value, each bit being manipulated outside of said frame buffer to give its assigned weight, to produce said total amount of said color/gray scale value for said display location.

2. The method of claim 1 wherein said color/gray scale values comprise luminance (Y), blue color difference (U) and red color difference (V).

3. The method of claim 2 wherein two frame buffer locations are assigned to luminance (Y) for every one assigned to blue color difference (U), and one frame buffer location is assigned to red color difference (V) for every one assigned to blue color difference (U).

4. The method of claim 3 wherein each color value has a weight of one of 4, 2 and 1.

5. The method of claim 4 wherein said Y values are assigned to alternate locations of said image in said memory in a checkerboard pattern, with every Y value in half of the diagonals formed by said checkerboard pattern in a first direction having a weight of 4.

6. The method of claim 5 wherein said U value is assigned to locations along every fourth diagonal formed by said checkerboard pattern in a second direction, with U values in alternate fourth diagonals having a weight of 4, said V value being assigned to a diagonal intermediate every said fourth U diagonal.

7. The method of claim 4 wherein half of the locations for each color value are assigned a weight of 4.

8. The method of claim 7 wherein said combining step further includes receiving a bit from two locations having a weight of 4, one location having a weight of 2 and one location having a weight of 1, and creating a 4-bit digital value with said weight 1 bit in the least significant position followed by said weight 2 bit, an exclusive OR function of said two weight 4 bits and an AND function of said two weight 4bits.

9. The method of claim 8 further comprising the steps of:
converting said 4-bit digital value into analog signal; and
converting said analog signal into an RGB signal.

10. The method of claim 1 wherein each frame buffer location corresponds to a separate element of said source image.

11. The method of claim 1 wherein, for at least one of said color/gray scale values, at least two color/gray scale values for a single display location have the same weight assigned.

12. An apparatus for mapping a source image into a display having a smaller number of display locations than said source image, comprising:
a frame buffer, each location of said frame buffer being assigned, in accordance with a predetermined pattern, to one of a plurality of color/gray scale values such that each color/gray scale value is assigned to a number of locations greater than the number of said display locations, said predetermined pattern intermixing said color/gray scale values such that each color/gray scale value for each display location is represented by a plurality of frame buffer locations separated by at least one location in either a row or column direction;
means for producing a plurality of color/gray scale patterns, each color/gray scale pattern being a bit pattern designed to produce a desired amount of said color or shade of gray when combined in accordance with said color/gray scale values and weights assigned to said frame buffer locations;
means for writing a representation of said source image into said frame buffer using said color/gray scale patterns such that a plurality of separate elements of said source image are mapped onto a block of proximate frame buffer locations used to represent a single display location; and
means for separately combining, to produce a total amount of each color/gray value, for each display location, from a block of proximate frame buffer locations corresponding to said display location, bits stored in locations which were assigned to said color/gray scale value, each bit being modified by its assigned weight, to produce said total amount of said color/gray scale value for said display location.

13. The apparatus of claim 12 wherein said color/gray scale values comprise luminance (Y), blue color difference (U) and red color difference (V).

14. The apparatus of claim 13 wherein two frame buffer locations are assigned to luminance (Y) for every one assigned to blue color difference (U), and one frame buffer location is assigned to red color difference (V) for ever one assigned to blue color difference (U). difference (V) for every one assigned to blue color difference (U).

15. The apparatus of claim 14 wherein each color value has a weight of one of 4, 2 and 1.

16. The apparatus of claim 15 wherein said Y values are assigned to alternate locations of said image in said memory in a checkerboard pattern, with every Y value in half of the diagonals formed by said checkerboard pattern in a first direction having a weight of 4.

17. The apparatus of claim 16 wherein said U value is assigned to locations along every fourth diagonal formed by said checkerboard pattern in a second direction, with U values in alternate fourth diagonals having a weight of 4, said V value being assigned to a diagonal intermediate every said fourth U diagonal.

18. The apparatus of claim 15 wherein half of the locations for each color value are assigned a weight of 4.

19. The apparatus of claim 18 wherein said means for combining further includes means for receiving a bit from two locations having a weight of 4, one location having a weight of 2 and one location having a weight of 1, and creating a 4-bit digital value with said weight 1 bit in the least significant position followed by said weight 2 bit, an exclusive OR function of said two weight 4 bits and an AND function of said two weight 4 bits.

20. The apparatus of claim 19 further comprising:
means for converting said 4-bit digital value into analog form; and
means for converting said YUV signals into RGB signals.

21. The apparatus of claim 12 wherein each frame buffer location corresponds to a separate element of said source image.

22. The apparatus of claim 12 wherein, for at least one of said color/gray scale values, at least two color/gray scale values for a single display location have the same weight assigned.

23. An apparatus for mapping a source image having YUV color values onto a color picture display having a smaller number of color picture display locations to condense said source image, comprising:
a frame buffer having a first portion for storing an image, each location of said first portion being assigned, in accordance with a first predetermined pattern, to one of Y, U and V color values such that each color value is assigned to a number of locations greater than the number of said color picture display locations and said Y value is assigned to twice as many locations as said U value, and said V value is assigned to an equal number of memory locations as said U value, said predetermined pattern intermixing said color values such that each color value for each display location is represented by a plurality of frame buffer locations separated by at least one location in either a row or column direction;

a plurality of color patterns stored in a second portion of said frame buffer, each color pattern being a bit pattern designed to produce a desired amount of said color when combined in accordance with said color values and weights assigned to said locations in said first portion of said frame buffer;

processing means for writing a representation of said source image into said first portions of said frame buffer using said color patterns from said second portions of said frame buffer such that a plurality of separate elements of said source image are mapped onto a block of proximate frame buffer locations used to represent a single display location;

weighting and decoding means for separately combining, to produce a total amount of each color value, for each display location from a block of proximate frame buffer locations corresponding to said display location, bits stored in locations which were assigned to said color value, each bit being modified by its assigned weight, to produce said total amount of said color value for said color picture display location;

three digital to analog converters coupled to receive said total amount for the Y, U and V color values, respectively; and means for converting said total amount of said Y, U and V values to RGB values.

24. An apparatus for mapping a source image having YUV color values onto a color picture display having a smaller number of color picture display locations to condense said source image, comprising:

a frame buffer for storing an image, each location of said frame buffer being assigned, in accordance with a first predetermined pattern, to one of Y, U and V color values such that each pair of picture display location there is a first block of buffer locations having a plurality of locations assigned a V value, with each V value in said block being separated from a next V value by at least one location in both the row and column directions, said first block including V values in at least two rows, said first block including a plurality of locations assigned a U value, with each U value in said block being separated from a next U value by at least one location in both the row and column directions, said first block including U values in at least two rows, said first block including two halves, each half block including a plurality of locations assigned a Y value, with each Y value in said block being separated from a next Y value by at least one location in both the row and column directions, each of said halves including Y values in at least two rows, such that each display location may have a different Y value but each pair of display locations will have the same U and V values;

a plurality of color patterns stored in a color pattern memory, each color pattern being a bit pattern designed to represent a desired amount of said color when combined in accordance with said color values and weights assigned to said locations in said first portion of said frame buffer;

processing means for writing a representation of said source image into said frame buffer using said color patterns from said color pattern memory such that a plurality of separate elements of said source image are mapped onto each half block of proximate frame buffer locations used to represent a single display location;

weighting and decoding means for separately combining, to produce a total amount of each color value, for each display location from a block of proximate frame buffer locations corresponding to said display location, bits stored in locations which were assigned to said color value, each bit being modified by its assigned weight, to produce said total amount of said color value for said color picture display location;

three digital to analog converters coupled to receive said total amount for the Y, U and V color values, respectively; and means for converting said total amount of said Y, U and V values to RGB values.

25. An apparatus for mapping a source image onto a display having a smaller number of display locations than said source image comprising the steps of:

assigning, in accordance with a first predetermined pattern one of a plurality of color/gray scale values to each location in a frame buffer, each color/gray scale value being assigned to a number of locations greater than the number of display locations, said predetermined pattern intermixing said color/gray scale values such that each color/gray scale value for each display location is represented by a plurality of frame buffer locations separated by at least one location in both a row and a column direction, with each color value for each display location being represented by at least two frame buffer locations in at least two rows;

assigning, in accordance with a second predetermined pattern, one of a plurality of weights to each said location in said frame buffer;

creating a plurality of color/gray scale patterns, each color/gray scale pattern being a bit pattern designed to produce a desired color or shade of gray when combined in accordance with said color/gray values and weights assigned to said frame buffer locations;

writing a representation of said source image into said frame buffer using said color/gray scale patterns such that a plurality of separate elements of said source image are mapped onto a block of proximate frame buffer locations used to represent a single display location; and separately combining, to produce a total amount of each color/gray scale value for each display location, from a block of proximate frame buffer locations corresponding to said display location, bits stored in locations which were assigned to said color/gray scale value, each bit being manipulated outside of said frame buffer to give its assigned weight, to produce said total amount of said color/gray scale value for said display location.

* * * * *